United States Patent
Bradbury et al.

(10) Patent No.: US 10,613,861 B2
(45) Date of Patent: *Apr. 7, 2020

(54) PROGRAMMABLE LINEAR FEEDBACK SHIFT REGISTER

(71) Applicant: International Business Machines Corporation, Armonk, NY (US)

(72) Inventors: Jonathan D. Bradbury, Poughkeepsie, NY (US); Steven R. Carlough, Poughkeepsie, NY (US); Brian R. Prasky, Campbell Hall, NY (US); Eric M. Schwarz, Gardner, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/873,931

(22) Filed: Jan. 18, 2018

(65) Prior Publication Data

US 2018/0143830 A1 May 24, 2018

Related U.S. Application Data

(63) Continuation of application No. 15/433,032, filed on Feb. 15, 2017, now Pat. No. 10,275,246, which is a
(Continued)

(51) Int. Cl.
*G06F 9/30* (2018.01)
*G06F 5/00* (2006.01)
*G06F 7/58* (2006.01)

(52) U.S. Cl.
CPC ............ *G06F 9/30029* (2013.01); *G06F 5/00* (2013.01); *G06F 7/584* (2013.01);
(Continued)

(58) Field of Classification Search
None
See application file for complete search history.

(56) References Cited

U.S. PATENT DOCUMENTS 5,751,614 A * 5/1998 Cohen .................... G06F 7/575
708/231
6,308,189 B1 * 10/2001 Nguyen .................. G06F 5/015
708/209

(Continued)

OTHER PUBLICATIONS

List of IBM Patents or Patent Applictions Treated as Related; (Appendix P), Filed Jan. 18, 2018, 2 pages.

*Primary Examiner* — Eric Coleman
(74) *Attorney, Agent, or Firm* — Cantor Colburn LLP; Steven Chiu (57) ABSTRACT

A method for implementing a programmable linear feedback shift register instruction, the method includes obtaining, by a processor, the machine instruction for execution, the machine instruction includes a first input operand indicating the current value of a shift register, wherein the shift register includes a data bit for each of a plurality of cells, a second input operand indicating a first sub-set of cells from the plurality of cells, and a logical operation specifier field indicating a logical operation to perform on the first and second input operands. Additionally, executing the machine instruction includes performing the logical operation based on the first input operand, the second input operand, and the logical operation specifier field, and generating an output operand by shifting the current value of the shift register to vacate a cell of the shift register and inserting an output value of the logical operation into the vacated cell of the shift register.

20 Claims, 5 Drawing Sheets

Related U.S. Application Data continuation of application No. 14/995,588, filed on Jan. 14, 2016, now Pat. No. 9,916,159.

(52) U.S. Cl.
CPC ...... *G06F 9/30032* (2013.01); *G06F 9/30098* (2013.01); *G06F 9/30101* (2013.01); *G06F 9/30134* (2013.01)

(56) References Cited

U.S. PATENT DOCUMENTS

| | | | |
|---|---|---|---|
| 9,747,105 B2 * | 8/2017 | Gopal | G06F 9/30029 |
| 9,766,892 B2 | 9/2017 | Chen et al. | |
| 2006/0106910 A1 * | 5/2006 | An | G06F 7/724 |
| | | | 708/607 |
| 2007/0008808 A1 * | 1/2007 | Schnieder | G11C 7/12 |
| | | | 365/189.18 |
| 2010/0077187 A1 * | 3/2010 | Plondke | G06F 9/30003 |
| | | | 712/223 |
| 2010/0185837 A1 * | 7/2010 | Dalrymple | G06F 7/388 |
| | | | 712/223 |
| 2014/0189289 A1 * | 7/2014 | Wolrich | H04W 12/02 |
| | | | 712/7 |
| 2014/0208078 A1 | 7/2014 | Bradbury | |
| 2016/0139924 A1 | 5/2016 | Evans et al. | |
| 2016/0179538 A1 | 6/2016 | Collins et al. | |
| 2017/0206084 A1 | 7/2017 | Bradbury | |
| 2017/0206085 A1 | 7/2017 | Bradbury | |

\* cited by examiner

PROGRAMMABLE LINEAR FEEDBACK SHIFT REGISTER

DOMESTIC PRIORITY

This application is a continuation of U.S. patent application Ser. No. 15/433,032, filed Feb. 15, 2017 which is a continuation of U.S. patent application Ser. No. 14/995,588, filed Jan. 14, 2016, the content of which is incorporated by reference herein in its entirety.

BACKGROUND

The present disclosure relates to the operation of a linear feedback shift register and more specifically, to a vector programmable linear feedback shift register.

In today's environment linear feedback shift registers (LFSR) are used to produce pseudorandom data needed for various applications. These applications include statistical analysis, random data simulations and random sampling. Other applications that utilize pseudorandom data include electronic games and cryptography. One technique for producing pseudorandom data includes the use of hashing algorithms. Linear feedback shift registers can be configured to reduce the probability of repeating random numbers by using larger shift registers or by adjusting the taps of the shift registers. Other benefits include a less complex hardware design that requires less power.

Hardware implementations of LFSRs are easily configured while software implementations require a large number of instructions. As the number of instructions to implement a software LFSR increases, processing efficiencies decrease. As a result, software implementations are generally limited to 64-bit shift registers and not a full 128-bit shift register due to the number of instructions that are required to be executed for the LFSR implementation and therefore the performance is reduced. In addition, pure hardware LFSRs are not as easy to re-configure as software versions of LFSRs, because the taps of the hardware LFSRs are fixed. What is needed is a technique to dynamically configure the hardware taps of shift registers in an efficient manner.

SUMMARY

In accordance with an embodiment of the invention, a computer-implemented method for implementing a programmable linear feedback shift register instruction is provided. The method includes executing a machine instruction in a central processing unit, where the method includes obtaining, by a processor, the machine instruction for execution, the machine instruction being defined for computer execution, the machine instruction includes a first input operand indicating the current value of a shift register, wherein the shift register includes a data bit for each of a plurality of cells, a second input operand indicating a first sub-set of cells from the plurality of cells, and a logical operation specifier field indicating a logical operation to perform on the first and second input operands. In addition executing the machine instruction includes performing the logical operation based on the first input operand, the second input operand, and the logical operation specifier field, and generating an output operand by shifting the current value of the shift register to vacate a cell of the shift register and inserting an output value of the logical operation into the vacated cell of the shift register.

In accordance with an embodiment of the invention, a computer system for executing a machine instruction in a central processing unit for implementing a programmable linear feedback shift register instruction is provided. The computer system includes a shift register, a logic module, a memory, and a processor in communications with the memory, wherein the computer system is configured to perform a method. The method includes obtaining, by a processor, the machine instruction for execution, the machine instruction being defined for computer execution, the machine instruction includes a first input operand indicating the current value of the shift register, wherein the shift register includes a data bit for each of a plurality of cells, a second input operand indicating a first sub-set of cells from the plurality of cells, and a logical operation specifier field indicating a logical operation to perform on the first and second input operands. In addition, executing the machine instruction includes performing the logical operation based on the first input operand, the second input operand, and the logical operation specifier field, and generating an output operand by shifting the current value of the shift register to vacate a cell of the shift register and inserting an output value of the logical operation into the vacated cell of the shift register.

In accordance with an embodiment of the invention, a computer program product for executing a machine instruction in a central processing unit, the computer program product including a non-transitory computer readable storage medium readable by a processing circuit and storing instructions for execution by the processing circuit for performing a method for implementing a programmable linear feedback shift register instruction is provided. The method includes obtaining, by a processor, the machine instruction for execution, the machine instruction being defined for computer execution, the machine instruction includes a first input operand indicating the current value of a shift register, wherein the shift register includes a data bit for each of a plurality of cells, a second input operand indicating a first sub-set of cells from the plurality of cells, and a logical operation specifier field indicating a logical operation to perform on the first and second input operands. In addition, executing the machine instruction includes performing the logical operation based on the first input operand, the second input operand, and the logical operation specifier field, and generating an output operand by shifting the current value of the shift register to vacate a cell of the shift register and inserting an output value of the logical operation into the vacated cell of the shift register.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

In accordance with exemplary embodiments of the disclosure, a method, system, and computer program product for a programmable LFSR instruction are provided. LFSRs may be implemented in either hardware, software or a combination thereof. Exemplary embodiments include dynamically configuring the LFSR by selecting different sub-sets of cells (taps) of the shift register as the inputs to a logic module and performing a logic operation on the data bits in the sub-set. In an exemplary embodiment, the sub-set of cells may be selected by a programmable vector, a mask of the shift register, or a list of indices identifying the plurality of cells of the shift register. The sub-set may include 2, 3, 4 . . . n number of cells of the shift register. In an exemplary embodiment a single machine instruction is executed in a central processing unit where the machine instruction includes a plurality of input operands and a logical operation specifier. In an exemplary embodiment a first input operand indicates a value to initialize the shift register, a second input operand indicates a sub-set of cells of the shift register, and the logical operation specifier indicates a logical operation to be performed based on the first and second input operands. An efficient technique to implement a vector programmable linear feedback shift register is provided herein.

Figure 1:
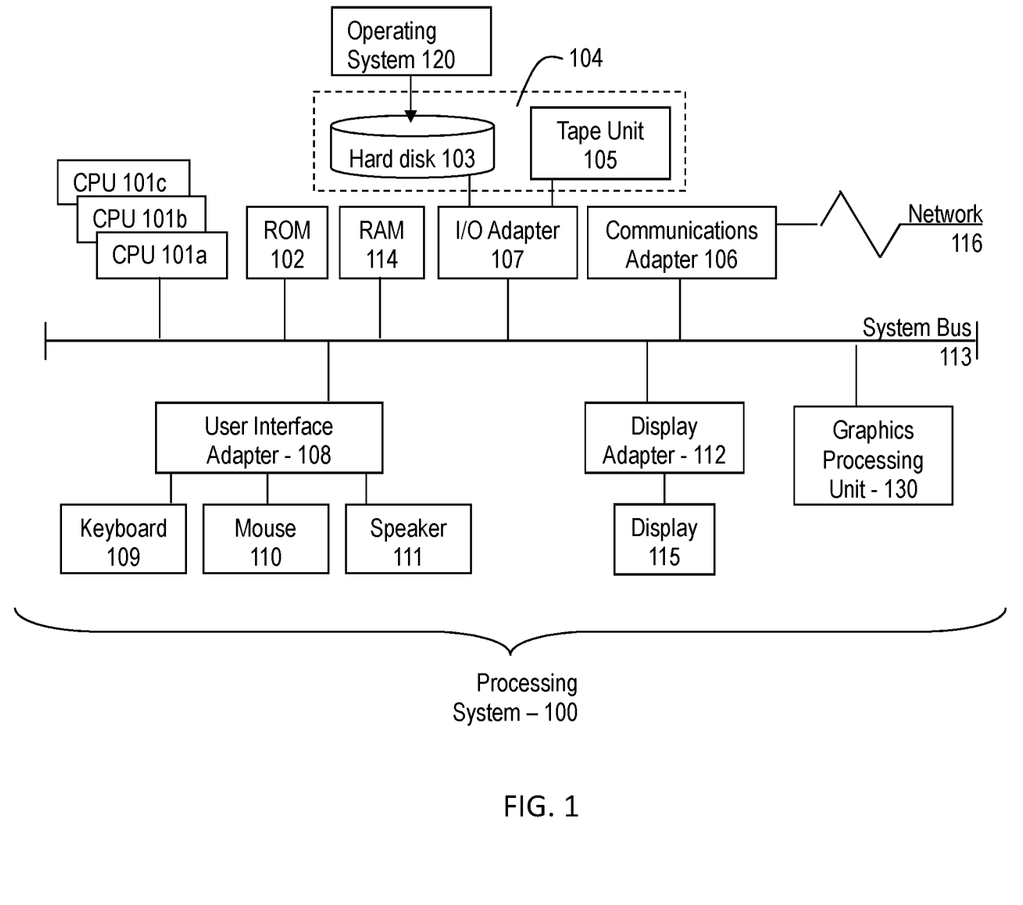
FIG. 1 is a block diagram illustrating one example of a processing system for practice of the teachings herein.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 1.

Figure 2:
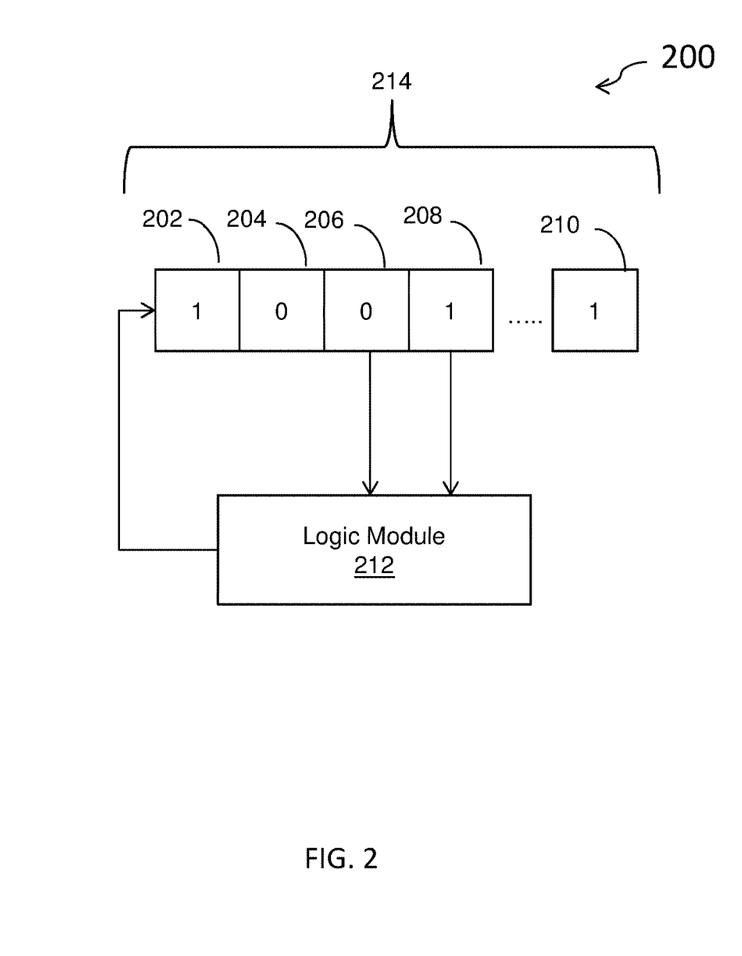
FIG. 2 is a block diagram illustrating a shift register in accordance with an exemplary embodiment.

Referring now to FIG. 2, a linear feedback shift register system 200 including a shift register 214 is provided. As illustrated, the shift register 214 includes a plurality of cells (202, 204, 206, 208 . . . 210). In some embodiments shift register 214 may be a 4, 8, 16, 32, 64, or 128 bit register. Of course, those of ordinary skill in the art will appreciate that larger shift registers are capable of being used in accordance with the invention. The shift register 214 stores a data bit in each of the plurality of cells 202-210 and the data bit of each cell 206 and cell 208 is provided to the logic module 212. In an exemplary embodiment the shift register is initialized with a value of the first input operand of a machine instruction. The cells (206 and 208) that provide the data bits to logic module 212 are referred to herein as taps. The cells selected as the taps are specified by the second input operand of the machine instruction. The logic module 212 may be configured to perform any type of logic operation and any number or combination of logic operations including, but not limited to, XOR, AND, NAND, OR, and NOR operations. In other embodiments, the logic module 212 is configured to receive any number of inputs from the shift register 214 and to perform logic operation(s) on the received inputs.

The operation of shift register 214 includes shifting the bits in the plurality of cells and removing the last bit of the shift register. The output value from the logic module 212 is inserted in the empty cell of the shift register 214. Bits are fed into either the leftmost or rightmost bit position of the shift register depending on the configuration of the shift register 214. In an exemplary embodiment the data bits in the plurality of cells are shifted leftward towards the most significant bit so that the cell of the least significant bit will be vacated. In another exemplary embodiment the data bits in the plurality of cells are shifted rightward towards the least significant bit so that the cell of the most significant bit will be vacated.

Figure 3:
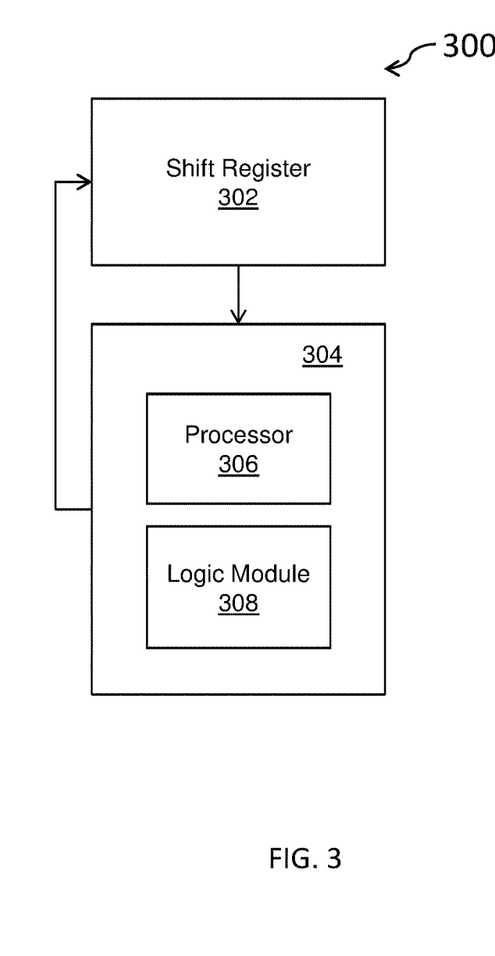
FIG. 3 is a block diagram illustrating an LFSR system in accordance with an exemplary embodiment.

Now referring to FIG. 3, an LFSR system 300 is illustrated in accordance with an exemplary embodiment. The LFSR system 300 includes a shift register 302 that is comprised of a plurality of cells, which each store a data bit. As illustrated, the shift register 302 is communicatively coupled to a processor system 304, which includes a processor 306 and a logic module 308. In an exemplary embodiment processor 306 is a central processing unit (CPU) for reading machine instructions. As shown in FIG.

3, shift register 302 is shown separate from processor system 304, however it is known to one of ordinary skill in the art that shift register 302 can also be disposed within processor system 304. In exemplary embodiments, the processor 306 controls the operation of the LFSR system 300 and is configured to select which cells of the shift register 302 provide inputs to logic module 308 based on a machine instruction. The processor 306 is configurable to select various sub-sets of cells of the shift register 302. In some embodiments the various sub-sets are selected based on an input operand of a machine instruction. The logic module 308 performs at least one logic operation indicated by a logical operation specifier on the data bits received from shift register 302. In an exemplary embodiment the machine instruction further includes an opcode field, and as an example the opcode field can be configured to function as an LFSR. Subsequently the bits of the plurality of cells in the shift register 302 are shifted and a single cell is vacated. The output of the logic operation of the logic module 308 is then fed back to the shift register 302 and inserted in the vacated cell generating an updated value for the shift register. Processor 306 can be configured to select a different sub-set of the plurality of cells of the shift register 302, based on the input operands of the machine instruction.

Figure 4A:
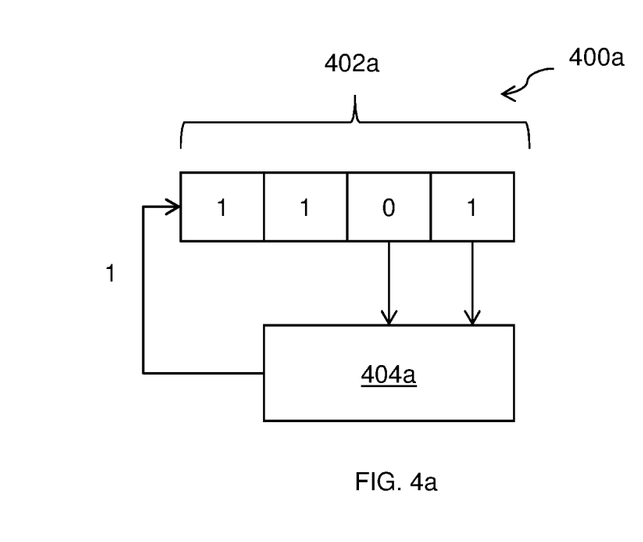
FIGS. 4a and 4b are block diagrams illustrating shift registers in accordance with an exemplary embodiment.

FIG. 4a illustrates a system 400a, including a configuration of a processor system 304 of FIG. 3 where a selected first sub-set of cells includes the third and fourth cells of shift register 402a. Logic module 404a receives the two data bits, 0 and 1 respectively, and performs the XOR of the two data bits. The logic module 404a outputs the data bit 1 to be inserted into shift register 402a when the plurality of cells is shifted.

In an exemplary embodiment the processor is configured to receive a machine instruction including at least a first and second input operand. The input operands may be stored and received from the same or different registers and/or memories. The first input operand represents a current value of the shift register 402a and the second input operand indicates a sub-set of cells to select for a logical operation. The machine instruction further includes a logical operation specifier field to indicate a logical operation to be performed on the input operands. In an example the logical operation specifier indicates an XOR operation. As a result of the processor executing the machine instruction an output operand is generated which represents the current value of the shift register after shifting the bits in the cells of the shift register and inserting an output of the logic module into the available cell.

Figure 4B:
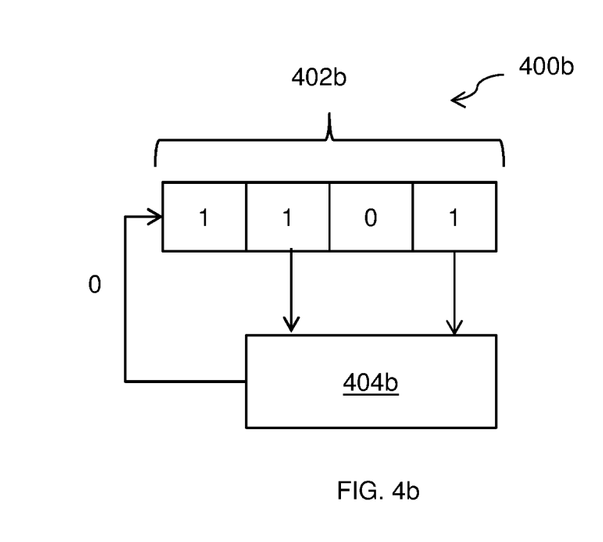

In an exemplary embodiment FIG. 4b illustrates a system 400b which is a subsequent configuration of processor system 304 of FIG. 3. System 400b depicts a second sub-set of cells is selected by the processor which includes the second and fourth cells of shift register 402b. The logic module 404b receives the two data bits, 1 and 1 respectively, and performs the XOR of the two data bits. The logic module 404b outputs the data bit 0 to be inserted into shift register 402b when the plurality of cells is shifted. In the foregoing examples, the sub-set of cells comprises two cells. This is an example and the number of cells of the sub-set may be any number of cells of the shift register. Also the logic operation is not limited to a single XOR operation but may be any logic operation or combination of logic operations and is capable of performing the logic operation on any number of received data bits of the sub-set of cells from the shift register. The logic operation can be configured by the logical operation specifier of the machine instruction.

Figure 5:
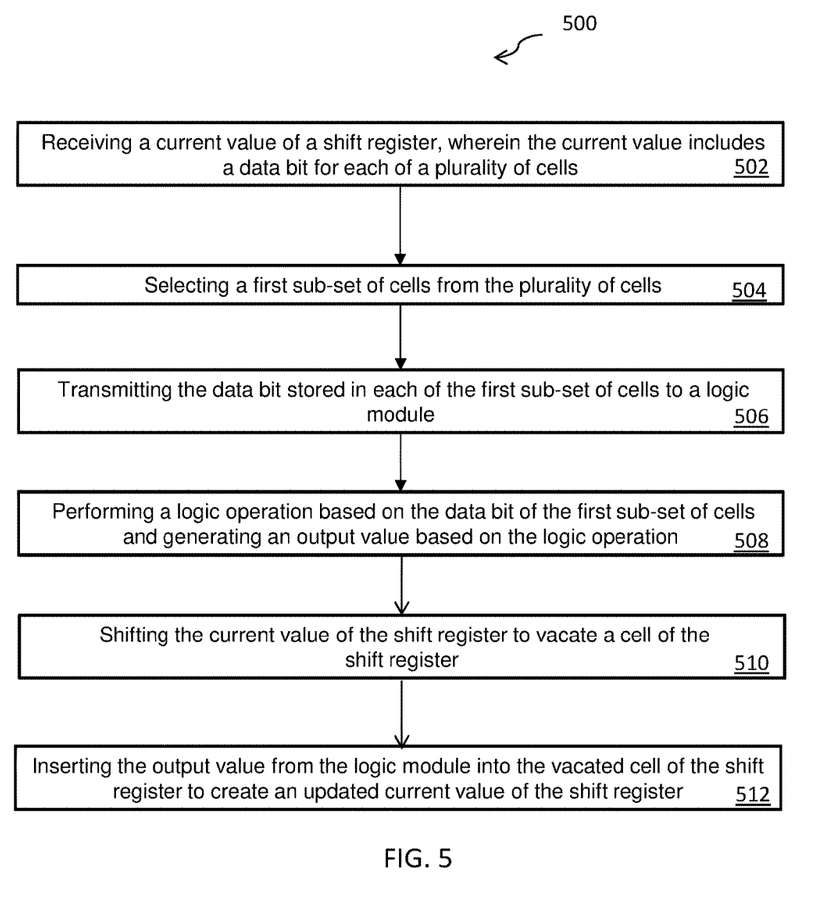
FIG. 5 is a flow diagram illustrating a computer implemented method for a vector programmable LFSR.

Now referring to FIG. 5, a flow diagram of a method 500 for a vector programmable LFSR in accordance with an exemplary embodiment is shown. As shown in block 502, the method 500 includes receiving a current value of a shift register from a first input operand of the machine instruction, wherein the current value includes a data bit for each of a plurality of cells. As shown in block 504 the method 500 includes selecting, via a processor, a first sub-set of cells from the plurality of cells as specified by a second input operand and block 506 includes transmitting the data bit stored in each of the first sub-set of cells to a logic module. In an exemplary embodiment a single machine instruction executed by the processor includes a first input operand representing the current value of the shift register and a second input operand for selecting a sub-set of cells of the shift register. The method 500 shows at block 508 performing, by the logic module, a logic operation based on the data bit of the first sub-set of cells and generating an output value based on the logic operation. In another embodiment, the machine instruction further includes a logical operation specifier field identifying the logical operation to be performed on the first and second input operands. As shown in block 510, the method 500 includes shifting the current value of the shift register to vacate a cell of the shift register. Block 512 of the method 500 shows inserting the output value from the logic module into the vacated cell of the shift register to create an updated value of the shift register. In an exemplary embodiment an output operand is generated by shifting the current value of the shift register and inserting an output value of the logic operation of the logic module. The output operand may be output to another system.

Figure 6:
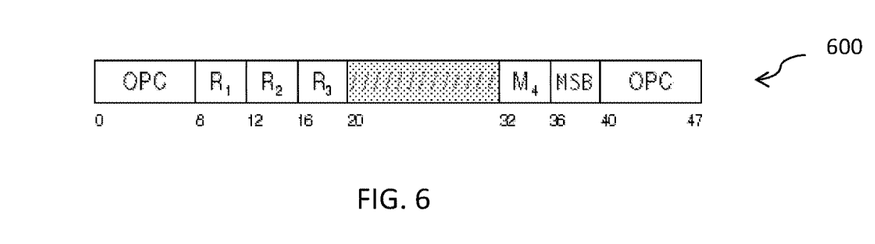
FIG. 6 illustrates a data structure for a vector programmable LFSR.

Referring now to FIG. 6, a diagram of data structure 600 for a vector programmable LFSR instruction in accordance with an exemplary embodiment is shown. The first field is an opcode field OPC. In an exemplary embodiment the OPC field is configured to operate an LFSR. The next field R1 represents an output operand which is the value output of the shift register after an update. Another field R2 stores the value of the first input operand and is the input value used to initialize the shift register. The field R3 holds the value of the second input operand which specifies the bits of the shift register to be used in the logical operation. The second input operand determines the taps of the shift register and may be a vector, mask, or list of indices for the shift register. The field M4 indicates a logical operation specifier. In an exemplary embodiment the logical operation specifier is configured to an XOR operation. The MSB field indicates the most significant bit value of the shift register and the last OPC field holds the value of a further opcode.

Figure 7:
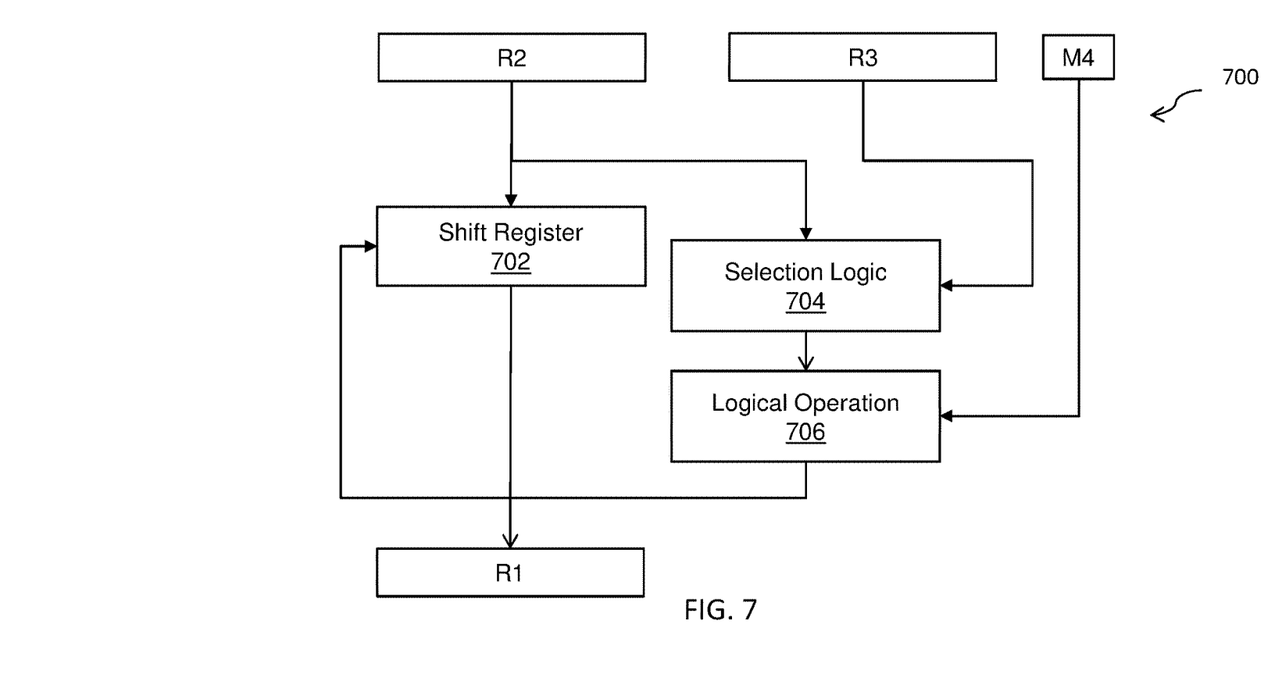
FIG. 7 is block diagram of illustrating a system for a vector programmable LFSR in accordance with an exemplary embodiment.

FIG. 7 depicts a system 700 for a vector programmable LFSR. System 700 includes a shift register 702 which is initialized with the value from the input operand designated by R2 from a vector programmable LFSR instruction. The system 700 further includes a selection logic 704 which receives the first and second input operands, where the first input operand R2 represents the value of the shift register and the second input operand R3 represents an index of bits to select for the logical operation. Logical operation block 706 performs the logical operation indicated by the logical operation specifier M4 of the machine instruction based on input operands R2 and R3. After the logical operation of block 706 is performed, the output value of the logical operation is inserted into shift register 702 upon shifting the bits in the shift register. Subsequently the value of the shift register is output as output operand R1.

In conclusion, the present invention provides in an exemplary embodiment a computer processor chip having a single LFSR instruction that selects a number of bits from a shift register, performs a logical operation on the selected bits, shifts the bits of the shift register by one bit and replaces the bit that has been shifted out by the output of the logical operation of the bits. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of executing a machine instruction in a central processing unit, the method comprising:

obtaining, by a processor, the machine instruction for execution, the machine instruction comprising:
  a first input operand indicating a current value of a shift register;
  a second input operand indicating a sub-set of cells of the shift register;
  a logical operation specifier field indicating a logical operation to perform on the first and second input operands;
  executing the machine instruction; and
  generating an output operand based at least in part on executing the machine instruction.

2. The method of claim 1, wherein executing the machine instruction includes performing the logical operation based at least in part on the first input operand, the second input operand, and the logical operation specifier field; and
  wherein generating the output operand comprises shifting the current value of the shift register and inserting an output value of the logical operation into the shift register.

3. The method of claim 1, wherein the logical operation is an XOR operation.

4. The method of claim 1, wherein the shifting vacates a cell of a least significant bit of the shift register.

5. The method of claim 1, wherein the shifting vacates a cell of a most significant bit of the shift register.

6. The method of claim 1, wherein the second input operand is based at least in part on a programmable vector, a mask, or a list of indices identifying a plurality of cells of the shift register.

7. The method of claim 1, wherein the input operands and the logical operation specifier are configurable by a user.

8. A computer system for executing a machine instruction in a central processing unit, the computer system comprising:
  a shift register;
  a logic module;
  a memory; and
  a processor in communications with the memory, wherein the computer system is configured to perform a method, said method comprising:
    obtaining, by a processor, the machine instruction for execution, the machine instruction comprising:
      a first input operand indicating a current value of the shift register;
      a second input operand indicating a sub-set of cells of the shift register;
      a logical operation specifier field indicating a logical operation to perform on the first and second input operands;
      executing the machine instruction; and
      generating an output operand based at least in part on executing the machine instruction.

9. The computer system of claim 8, wherein executing the machine instruction includes performing the logical operation based at least in part on the first input operand, the second input operand, and the logical operation specifier field; and
  wherein generating the output operand includes shifting the current value of the shift register and inserting an output value of the logical operation into the shift register.

10. The computer system of claim 8, wherein the logical operation is an XOR operation.

11. The computer system of claim 8, wherein the shifting vacates a cell of a least significant bit of the shift register.

12. The computer system of claim 8, wherein the shifting vacates a cell of a most significant bit of the shift register.

13. The computer system of claim 8, wherein the second input operand is based at least in part on a programmable vector, a mask, or a list of indices identifying a plurality of cells of the shift register.

14. The computer system of claim 8, wherein the first and the second input operands and the logical operation specifier are configurable by a user.

15. A computer program product for executing a machine instruction in a central processing unit, the computer program product comprising: a non-transitory computer readable storage medium readable by a processing circuit and storing instructions for execution by the processing circuit for performing a method comprising:
  obtaining, by a processor, the machine instruction for execution, the machine instruction comprising:
    a first input operand indicating the current value of a shift register;
    a second input operand indicating a sub-set of cells of the shift register;
    a logical operation specifier field indicating a logical operation to perform on the first and second input operands;
    executing the machine instruction; and
    generating an output operand based at least in part on executing the machine instruction.

16. The computer program product of claim 15, wherein executing the machine instruction includes performing the logical operation based at least in part on the first input operand, the second input operand, and the logical operation specifier field; and
  wherein generating the output operand includes shifting the current value of the shift register and inserting an output value of the logical operation into the shift register.

17. The computer program product of claim 15, wherein the logical operation is an XOR operation.

18. The computer program product of claim 15, wherein the shifting vacates a cell of a least significant bit or a most significant bit of the shift register.

19. The computer program product of claim 15, wherein the second input operand is based at least in part on a programmable vector, a mask, or a list of indices identifying a plurality of cells of the shift register.

20. The computer program product of claim 15, wherein the first and second input operands and the logical operation specifier are configurable by a user.

* * * * *